(12) United States Patent
D'Haene et al.

(10) Patent No.: US 7,510,456 B2
(45) Date of Patent: Mar. 31, 2009

(54) METHOD OF MAKING IMPACT RESISTANT, DIRECT CONTACT PLASMA DISPLAY PANEL FILTERS

(75) Inventors: Pol D'Haene, Kessel-Lo (BE); Aristotelis Karagiannis, Amherst, MA (US)

(73) Assignee: Solutia Incorporated, St. Louis, MO (US)

( * ) Notice: Subject to any disclaimer, the term of this patent is extended or adjusted under 35 U.S.C. 154(b) by 608 days.

(21) Appl. No.: 11/170,375

(22) Filed: Jun. 30, 2005

(65) Prior Publication Data
US 2007/0001567 A1    Jan. 4, 2007

(51) Int. Cl.
*B29C 60/00* (2006.01)
(52) U.S. Cl. .................. 445/24; 313/582; 313/112; 156/106
(58) Field of Classification Search ......... 313/582–587, 313/489, 112; 156/106, 244.11, 244.27, 156/244.26, 244.22, 99, 500, 244.12; 428/847.4, 428/411.1, 415
See application file for complete search history.

(56) References Cited

U.S. PATENT DOCUMENTS

| | | | |
|---|---|---|---|
| 3,976,528 A * | 8/1976 | James | 156/244.23 |
| 4,952,457 A | 8/1990 | Cartier | |
| 5,061,568 A | 10/1991 | Kessel | |
| 5,466,755 A | 11/1995 | Sakagami et al. | |
| 5,804,102 A | 9/1998 | Oi et al. | |
| 5,811,923 A | 9/1998 | Zieba et al. | |
| 5,830,568 A | 11/1998 | Kondo | |
| 5,945,209 A | 8/1999 | Okazaki et al. | |
| 6,067,188 A | 5/2000 | Zieba et al. | |
| 6,084,705 A | 7/2000 | Zieba et al. | |
| 6,104,530 A | 8/2000 | Okamura et al. | |
| 6,255,031 B1 | 7/2001 | Yao et al. | |
| 6,262,364 B1 | 7/2001 | Yoshikawa | |
| 6,323,340 B1 | 11/2001 | Masuda et al. | |
| 6,333,592 B1 | 12/2001 | Sasa | |
| 6,391,462 B1 | 5/2002 | Jang | |
| 6,469,685 B1 | 10/2002 | Woodruff et al. | |
| 6,522,463 B1 | 2/2003 | Shimomura et al. | |
| 6,680,009 B2 | 1/2004 | Harada et al. | |
| 7,245,079 B2 * | 7/2007 | D'Haene et al. | 313/587 |
| 2002/0005509 A1 | 1/2002 | Teng | |
| 2002/0018890 A1 | 2/2002 | Sugimachi | |
| 2002/0140339 A1 | 10/2002 | Lee et al. | |
| 2003/0054160 A1 | 3/2003 | Fisher el al. | |
| 2003/0128172 A1 | 7/2003 | Terui | |
| 2003/0186040 A1 | 10/2003 | Oya | |
| 2003/0234995 A1 | 12/2003 | Masuda et al. | |
| 2004/0239251 A1 | 12/2004 | D'Haene | |
| 2005/0136243 A1 * | 6/2005 | Fisher | 428/323 |

FOREIGN PATENT DOCUMENTS

| | | |
|---|---|---|
| EP | 0782164 | 7/1997 |
| EP | 949648 | 10/1999 |
| EP | 1 189 078 | 3/2002 |

(Continued)

*Primary Examiner*—Peter Macchiarolo
(74) *Attorney, Agent, or Firm*—Brenc Law

(57) ABSTRACT

The present invention is in the field of plasma display panel filters, and more specifically the present invention is in the field of multiple layer plasma display panel filters that can be effectively mounted directly to the front glass surface of a plasma display panel module.

17 Claims, 2 Drawing Sheets

FOREIGN PATENT DOCUMENTS

| | | |
|---|---|---|
| EP | 1197528 | 4/2002 |
| EP | 1251 369 | 10/2002 |
| EP | 1253445 | 10/2002 |
| EP | 1275985 | 1/2003 |
| EP | 1385024 | 1/2004 |
| EP | 1 398 652 | 3/2004 |
| JP | 2002189420 A | 7/2002 |
| JP | 2002189423 A | 7/2002 |
| WO | WO 2004/016053 A2 | 2/2004 |

* cited by examiner

METHOD OF MAKING IMPACT RESISTANT, DIRECT CONTACT PLASMA DISPLAY PANEL FILTERS

FIELD OF THE INVENTION

The present invention is in the field of plasma display panel filters, and more specifically the present invention is in the field of multiple layer plasma display panel filters that can be effectively mounted directly to the front glass surface of a plasma display panel module.

BACKGROUND

Plasma display panels (PDPs) for televisions and other applications create an image by discharging gas plasma, which, in combination with coated phosphorous layers, generates light having desirable characteristics. Relative to conventional cathode ray tubes, plasma display panels can have superior display capacity, luminance, and contrast. In plasma display panels, application of a voltage between electrodes creates a discharge of gas plasma, resulting in the emission of ultraviolet (UV) light. The UV emission excites adjacent phosphor materials, resulting in electromagnetic emission of visible light.

Plasma display panels emit electromagnetic radiation having different emission spectra that need to be modified prior to viewing. Optical filters have been used for this purpose. Optical filters can include, for example, a transparent substrate, an antireflective layer on the front surface of the transparent substrate for preventing ambient light reflections, and an electromagnetic wave shield on the rear surface of the transparent substrate.

Many conventional plasma display panel filters that employ multiple polymeric layers are manufactured for use as a filter that is positioned on a viewer's side of a plasma display panel module with an air space between the filter and the module. Such positioning results in several disadvantages, including unwanted reflection at the back of the filter, which can create the need for an additional anti-reflective layer, and the use of additional glass layers, which adds to the overall weight of the unit.

What are needed in the art are plasma display panel filters having, relative to conventional plasma display panel filters, simple and safe multiple layer designs that can be used directly in contact with a plasma display panel module.

SUMMARY OF THE INVENTION

The present invention provides plasma display panel filters that can be disposed directly on a plasma display panel module and that comprise at least one impact resistant viscoelastic polymer sheet disposed between two polymer film layers. Also included are plasma display panel devices utilizing plasma display panel filters of the present invention, methods of manufacturing plasma panel filters and devices, and methods of filtering plasma display panel radiation.

DETAILED DESCRIPTION

The present invention provides a plasma display panel filter that can be directly disposed on the front of a plasma display panel module. This positioning both reduces potential reflected images at the back of the filter that could impede viewing and eliminates the need for an additional glass filter mounting substrate, thereby reducing the overall weight of the plasma display panel. Of course, the plasma display panel filters disclosed herein can also be used in place of conventional filters mounted on a glass substrate that is not physically disposed against a plasma display panel module.

As used herein, a plasma display panel module is the unit in which the gas plasma discharges occur, and a plasma display panel module typically comprises phosphor layers, cell structures, and gas plasma disposed between two panes of glass.

Figure 1:
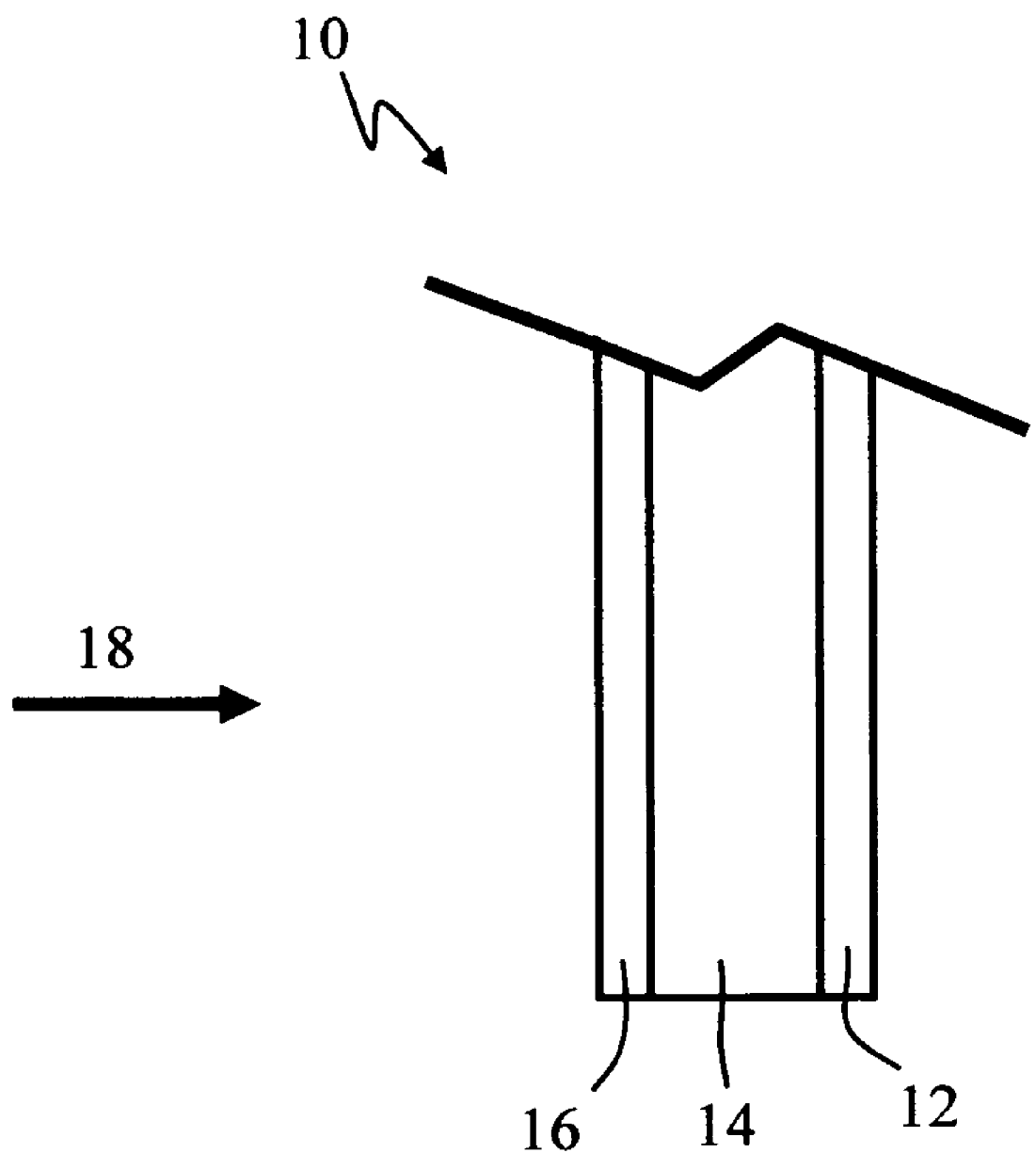
FIG. 1 is a schematic cross-sectional view of a portion of a plasma display panel filter of the present invention.

As shown in FIG. 1 as a partial cross section of a plasma display panel filter generally at 10, a polymer sheet stack 14 is disposed between a first polymer film 12 and a second polymer film 16. The polymer sheet stack 14 can comprise a single polymer sheet, or more than one polymer sheet. As will be described in detail below, polymer sheets of the present invention can comprise any suitable, impact-resistant polymer, and in various embodiments a polymer sheet will comprise poly(vinyl butyral), polyurethane, or ethylene vinyl acetate. Polymer sheets of the present invention can also comprise various agents, and specifically infrared absorbing agents.

As will also be described in detail below, polymer films of the present invention can comprise any suitable performance film-type polymer, and in various embodiments a polymer film will comprise poly(ethylene terephthalate) (PET), poly(ethylene napthalate)(PEN), cellulose acetate, or poly(ethylene terephthalate)-glycol modified (PETG).

The first polymer film 12 and the second polymer film 16 can be the same or different. As shown in FIG. 1, the second polymer film 16 is positioned toward the viewing space 18, and this orientation will generally determine the choice of materials for the first polymer film 12 and the second polymer film 16. For example, the second polymer film can include a hard coat and/or antireflective coating, as will be described in detail elsewhere herein, on its surface that faces the viewing space 18. Further, the first polymer film 12 can include an electromagnetic shielding component. Additionally, either or both the first polymer film and the second polymer film can include dyes, pigments, or other additives as are known in the art to be useful in plasma display panel filters.

The polymer sheet stack can be a single polymer sheet, or can be a combination of polymer sheets or polymer sheets and other layers. Various examples of the layers that can be combined to form the polymer sheet stack include, but are not limited to:

(polymer sheet)$_n$ (polymer sheet//polymer film//polymer sheet)$_m$ where n is 1-10 and preferably less than 5, and more preferably 1, 2, or 3, and m is 1-5 and preferably 1 or 2.

Plasma display panel filters of the present invention can be disposed on a pane of glass or other rigid substrate for use as a conventional plasma display panel filter that is not in contact with a plasma display panel module by using an adhesive to bond the plasma display panel filter to the glass layer. Further, plasma display panel filters of the present invention can be disposed between two panes of glass to form a plasma display panel filter.

In other embodiments, a plasma display panel filter of the present invention can advantageously be disposed directly on a plasma display panel module by utilizing an adhesive between the plasma display panel module and the plasma display panel filter. The adhesive can be any conventionally used adhesive composition, and it can be sprayed, applied as a separate layer or film, or otherwise directly applied to the first polymer film, shown as element 12 in FIG. 1. Alternatively, the adhesive can be applied to the plasma display panel module and a plasma display panel filter of the present invention can then be applied to the adhesive. In various embodiments a pressure sensitive adhesive is used. In various embodiments, a plasma display panel filter can be formed with a pressure sensitive adhesive layer disposed on the first polymer sheet and a release film disposed on the adhesive layer. Installation of the plasma display panel filter then comprises removal of the release film and subsequent pressing of the plasma display panel filter to a plasma display panel module.

Plasma display panel filters of the present invention preferably have an overall thickness of less than 2 millimeters, less than 1.5 millimeters, or less than 1 millimeter.

In various embodiments of the present invention, plasma display panel filters are able to absorb a shock of greater than 0.5 Joules, greater than 0.75 Joules, or greater than 1.0 Joules without allowing breakage of an adhered layer, and, for illustrative purposes, a layer of adhered, annealed glass.

The plasma display panel filters of the present invention can be fabricated through any method known in the art. For example, a polymer film//polymer sheet//polymer film construct such as the one shown in FIG. 1 can be formed as a stack of associated layers, positioned between two panes of glass, and then laminated. After lamination, the glass layers can be removed, leaving the plasma display panel filter embodiment shown in FIG. 1. Another method uses melt extrusion of two polymer sheets onto two separate polymer films to form two separate two layer constructs, followed by a lamination step during which the two polymer sheets are disposed in contact with each other and the entire stack is laminated. A further method involves applying a solution coating on a surface of two polymer films, wherein the solution coating comprises a crosslinkable system, disposing a polymer sheet in contact with the coated surfaces of the two polymer films, and starting the crosslinking reaction by means of heat and ultraviolet radiation. Another technique involves the coating of both separate polymer films using a polymeric dispersion. This coated dispersion will form a viscoelastic layer on the surface of the polymer film upon drying.

Figure 2:
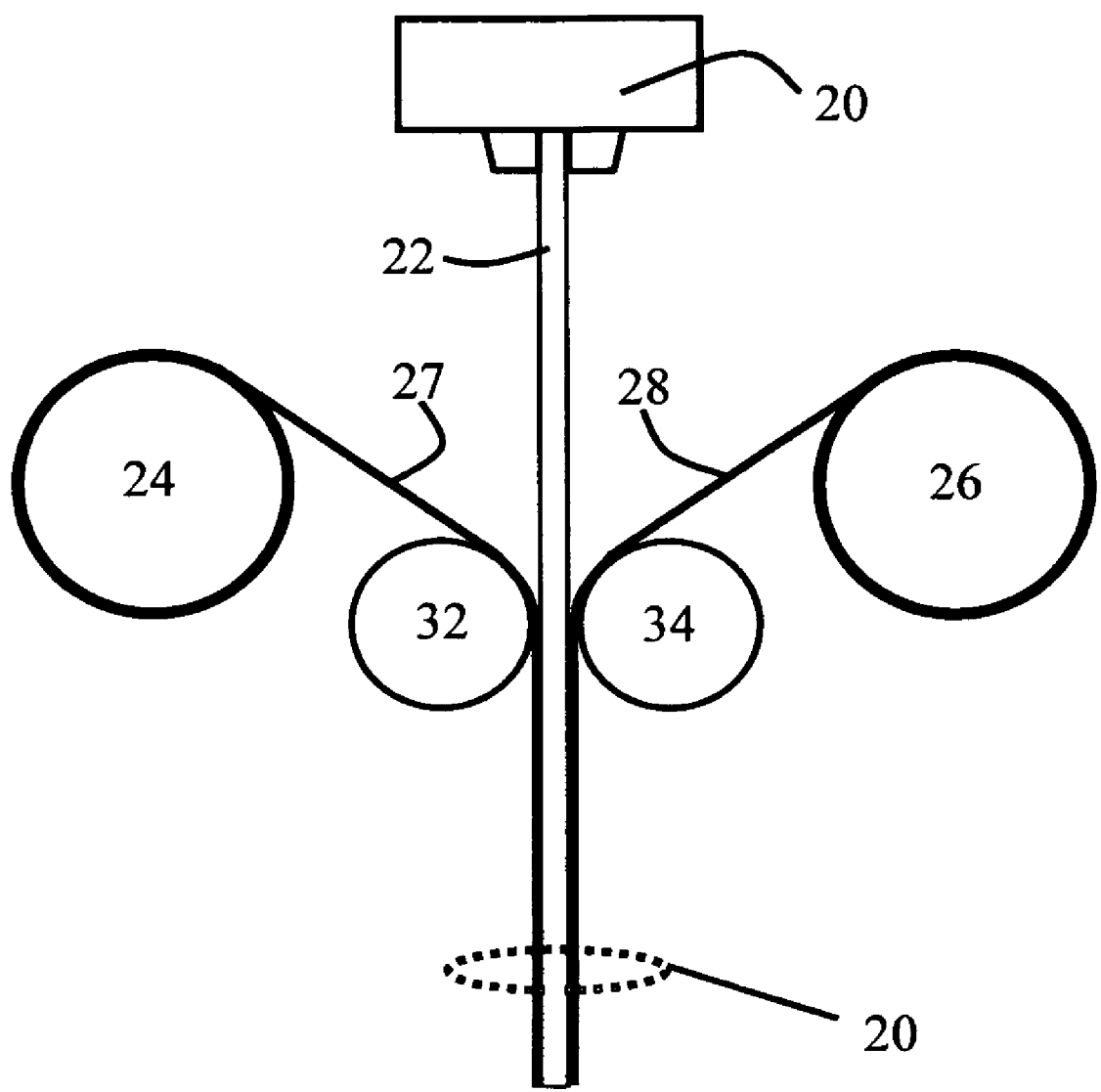
FIG. 2 is a schematic cross-sectional view of a method for manufacturing a plasma display panel filter of the present invention.

The present invention also includes methods of manufacturing a plasma display panel filter of the present invention by forming the multiple layer construct immediately after extrusion of the polymer sheet stack. As shown in FIG. 2, a polymer sheet 22 is extruded from an extruder 20. A first polymer film roll 24 and a second polymer film roll 26 feed a first polymer film 27 and a second polymer film 28 over a first roller 32 and second roller 34, respectively. The first roller 32 and second roller 34 are held in fixed relative position or are configured to apply an inward pressure. As shown in the Figure, the first polymer film 27, the polymer sheet 22, and the second polymer film 28 are forced together between the first roller 32 and second roller 34 while the polymer sheet 22 is in the hot melt phase, thereby laminating the three into a single plasma display panel filter 20. The rollers 32, 34 can be any suitable rollers, and in various embodiments the rollers are polished, cooled or heated, rollers. In other embodiments, a coextruded polymer sheet can be used. In yet other embodiments, multiple polymer sheets can be extruded separately and directed through the first roller 32 and second roller 34 to form a plasma display panel filter with a multiple polymer sheet polymer sheet stack.

In these embodiments, it is particularly preferable to employ a plasticized poly(vinyl butyral) polymer sheet as element 22 in FIG. 2. The poly(vinyl butyral) sheet, in various embodiments, will be produced with a relatively smooth surface topology so as to permit proper lamination with the polymer films 26, 28 under high temperature conditions. In these embodiments, a surface roughness ($R_z$) of less than 20 microns, less than 15 microns, or less than 10 microns can be employed. Using this technique, little or no further heat treatment of the laminated construct is required. A very smooth polymer sheet can be produced by, for example, increasing the die lip temperature on the extruder or using a smooth coated surface on the die lip, as well as any other methods conventionally used in the art.

Methods of the present invention include application of any of the plasma display panel filters of the present invention to a plasma display panel module using little or no heat and added pressure. Such a low heat, low pressure application is particularly useful for plasma display panel modules that can be damaged or ruined if high heat and pressure are used to laminate one or more layers onto the plasma display panel module. In various embodiments of the present invention, a plasma display panel filter of the present invention is adhered to a plasma display panel module with an adhesive and the use of less than 60° C., 50° C., or 45° C. and a pressure of less than 2 bars, and preferably less than 1 bar.

Polymer Sheet

Polymer sheets of the present invention can comprise any suitable thermoplastic polymer, for example poly(vinyl butyral), polyurethane, ethylene vinyl acetate, acrylates, and silicones. Suitable polymers for use in polymer sheets of the present invention can be formed into sheets, can function to carry pigments and other additives, have acceptable optical properties, are stable, and can be readily adhered to glass, polymer films, and other media. Specifically contemplated are poly(vinyl butyral) formulations disclosed in U.S. Pat. Re. Nos. 20,430; 2,496,480; 3,271,235; 5,853,828; 6,093,471; and, 6,559,212.

As used in polymer sheet stacks of the present invention, polymer sheets function as impact resistant layers and agent carrying layers. Generally, as is well known in the art, the thickness and composition of one or more polymer sheets can be readily controlled to yield a sheet of the desired thickness that has the desired impact resistant characteristics. Further, two or more sheets can be combined to yield a desired net effect. For example, a polymer sheet stack can consist of a first polymer sheet that comprises a particular dye or pigment, while a second, adjacent polymer sheet can comprise a different dye or pigment, for example one that is not readily compatible with the first dye or pigment. Such polymer sheet combinations offer a simple and efficient method of combining polymer sheets to yield a desirable finished laminate without having to formulate and manufacture a sheet that would offer the combined benefits.

In various embodiments of the present invention, a polymer sheet comprises poly(vinyl butyral). In one embodiment of the present invention, poly(vinyl butyral) resin used to form any one or more poly(vinyl butyral) sheets comprises 2 to 50 weight percent, 5 to 40, 8 to 35, or 10 to 30 weight percent hydroxyl groups expressed as polyvinyl alcohol, and 0 to 5 weight percent, 0 to 4, 0 to 3, or 0 to 2.5 weight percent acetate expressed as polyvinyl acetate, with the balance being butyral expressed as poly(vinyl butyral). Poly(vinyl butyral) sheets are commercially available from Solutia Inc., (Springfield, Mass.) as Saflex® and E. I. Dupont de Nemours and Company (Wilmington, Del.) as Butacite®.

In various embodiments of the present invention a poly (vinyl butyral) layer can contain 10 to 90, 20 to 80, 20 to 60, or 25 to 45 parts of plasticizer per 100 parts of poly(vinyl butyral) resin. Examples of plasticizers are disclosed in U.S. Pat. No. 4,654,179. In one embodiment, dihexyl adipate and/or triethylene glycol di-2 ethylhexanoate are used.

Polymer sheets of the present invention can additionally comprise additives to improve performance such as dyes, pigment colorants, UV stabilizers, antioxidants, glass adhesion control agents, and the like.

Polymer sheets of the present invention can comprise an optical filter agent absorbing at 590 nanometers, which preferably is compatible with the base polymer sheet polymer. In various embodiments, the agent absorbing at 590 nanometers selectively absorbs at 590 nanometers, which means the agent absorbs light in a very narrow band around 590 nanometers. This optical filter serves as an absorber of the light specifically emitted by the excited neon gas, which typically is part of the gas of the plasma display unit. This wavelength preferably is absorbed in order to obtain an improved color balance. Examples of potential optical filter agents include, but are not limited to, cyanine-based dye, azulenium-based dye, squalium-based dye, diphenylmethane-based dye, triphenylmethane-based dye, oxazine-based dye, azine-based dye, thiopyrylium-based dye, viologen-based dye, azo-based dye, metal azo-based complex dye, bisazo-based dye, naphthoquinone-based dye, anthraquinone-based dye, perylene-based dye, indanthrone-based dye, phthalocyanine-based dye, napthalocyanine based dye, nitroso-based dye, metal dithiol-based dye, indoaniline-based dye, quinoline-based dye. Examples of useful dyes include Gentex Filtron A178 (Gentex Corp., Carbondale, Pa.), Gentex Filtron A193, Pyrromethene 650 (Lambda Physik, Gottingen, Germany), and DQOCI (Lambda Physik), among others.

Polymer sheets of the present invention can comprise one or more near infrared (NIR) absorbers. The main purpose of a near infrared absorber is to absorb radiation in the wavelength range of 800 nanometers to 1,200 nanometers, which facilitates the use of remote control devices operating within this frequency range. Examples of useful near infrared absorber agents include, but are not limited to, cyanine-based dye, azulenium-based dye, squarylium-based dye, diphenylmethane-based dye, triphenylmethane-based dye, oxazine-based dye, azine-based dye, thiopyrylium-based dye, viologen-based dye, azo-based dye, metal azo-based complex dye, bisazo-based dye, naphthoquinone-based dye, anthraquinone-based dye, perylene-based dye, indanthrone-based dye, phthalocyanine-based dye, napthalocyanine based dye, nitroso-based dye, metal dithiol-based dye, indoaniline-based dye, quinoline-based dye. Examples of useful dyes include Gentex Filtron A101, Gentex Filtron A195, Keystone TB225 (Keystone Aniline Corp., Chicago Ill.), Keysorb 975 nanometers, TN228 Keysorb 993 nanometers, IR5, IR26, IR132 from Lambda Physik, or quaterrylenetetracarboxylic diimides such as those disclosed in published U.S. patent application 20020182422.

Near infrared absorption can also be accomplished using nanoparticle technology and may include the incorporation of antimony tin oxide (ATO), indium tin oxide (ITO) (see U.S. Pat. No. 5,830,568), $LaB_6$ (lanthanum hexaboride, U.S. patent application 200200086926), or semiconductor nanoparticles, among others.

In a preferred embodiment, one or more polymer sheets of a plasma display panel filter of the present invention comprises a near infrared absorber, and, in specific embodiments, the additional near infrared absorber is selected from the group consisting of $LaB_6$, Gentex Filtron A101, Gentex Filtron A195, Gentex Filtron A208, and quaterrylenetetracarboxylic diimides.

Phthalocyanine dyes and dithiol metal complex dyes are particularly suitable for use as near infrared absorbing agents in the polymer sheet layers of the present invention. These dyes offer surprisingly good thermal stability and near infrared absorption, without also excessively negatively impacting the color properties and light transmission properties of the layer.

In various embodiments of the present invention, one or more of the polymer sheets comprises a phthalocyanine dye, a dithiol metal complex dye, $LaB_6$, or combinations thereof.

In various embodiments, one or more of the polymer sheet layers comprises a phthalocyanine dye. The phthalocyanine dye can be combined with any of the other agents disclosed herein. Preferred phthalocyanine dyes include Excolor IR12, Excolor IR14, TX-Ex 906B, TX-Ex 910, and Excolor IR10A (available from Nippon Shokubai (Osaka, Japan)), Pro-jet 900NP and Pro-jet 830NP (available from Avecia, Manchester, United Kingdom), and YKR-3070, YKR-3080, and YKR-3081 (available from Yamamoto Chemicals, Inc. Osaka, Japan). Other phthalocyanine dyes that can be used include those disclosed in U.S. Pat. No. 6,323,340 and those available from Mitsui Chemicals, Incorporated, Tokyo, Japan, and Keystone Aniline Corporation, Chicago, Ill.

These phthalocyanine dyes can be incorporated into the polymer sheets of the present invention in any suitable concentration, depending on the application, as will be readily determinable by those of skill in the art. In various embodiments, for example, phthalocyanine dyes are incorporated into a polymer sheet of 0.5 millimeters thickness at a weight/weight concentration of 0.01 to 0.20, 0.015 to 0.15, or 0.05 to 0.10. Generally, sheets of greater thickness can have lower concentrations of phthalocyanine dyes, and sheets of lesser thickness can have greater concentrations of phthalocyanine dyes to achieve the desired results.

In various embodiments of the present invention, the phthalocyanine dye comprises one or more NHR— side groups, one or more SR— side groups, and, optionally, a halogen group, where the R is a substituted or non-substituted phenyl, alkyl, or aryl group. In various embodiments of the present invention, the phthalocyanine dye is complexed with antimony.

In various embodiments of the present invention, the phthalocyanine dye comprises one or more NHR— side groups and, optionally, a halogen group, where the R is a substituted or non-substituted phenyl, alkyl, or aryl group.

In various embodiments of the present invention, the phthalocyanine dye comprises one or more SR— side groups, and, optionally, a halogen group, where the R is a substituted or non-substituted phenyl, alkyl, or aryl group.

In various embodiments, one or more of the polymer sheets comprises a dithiol metal complex dye. Any compatible dithiol metal complex dye as is known in the art can be used, and examples include those disclosed in U.S. Pat. No. 6,522,463 and EP 1385024. In various embodiments, the dithiol metal complex dye is MIR-101 (available from Midori Kagaku Company, Tokyo, Japan). In various embodiments, the dithiol metal complex dye is Gentex Filtron A208 (available from Gentex Corporation, Carbondale, Pa.).

In various embodiments, one or more of the polymer sheet layers comprises $LaB_6$.

In general, the dye used can be chosen because it provides a high visible/near infrared transmission ratio and provides a relatively flat transmission across the visible spectrum. In various embodiments of the present invention, one or more polymer sheets having one or more of the agents described herein will have the following optical characteristics when produced at a thickness of 450 microns laminated between two sheets of 2 mm thick glass:

- a transmission below 2%, 1.5%, or 1% over the range of 300-380 nanometers
- a transmission from 30% to 70%, 35% to 70%, or 35% to 65% over the ranges of 400-582 nanometers and 596-780 nanometers
- a transmission of less than 60%, less than 50%, or less than 40% over the range of 583-595 nanometers
- variation of less than 15%, 13%, 10%, 7%, or 5% over the ranges of 420-579 nanometers and 611-800 nanometers
- a transmission of less than 20%, 17.5%, or 15% over the range of 800-1,200 nanometers
- a transmission of less than 15%, 12.5%, or 10% over the range of 820-980 nanometers and
- a color transmission value a* in the range −7 to 7, −6 to 6, −5 to 5, or −5 to 0 and a b* value in the range −15 to 7, −12 to 6, −10 to 5, or −10 to −2.

The different ranges given above for the optical properties can be combined in any suitable combinations, as desired.

In various embodiments of the present invention, a polymer sheet is provided comprising a thermoplastic polymer, such as poly(vinyl butyral), ethylene vinyl acetate, or polyurethane, having the optical properties just described and a functional additive system. In these embodiments, the polymer (resin and plasticizer, where appropriate) can comprise from 98 to 99.9% by weight of the polymer sheet, with the functional additive system constituting 0.01 to 2%, 0.2 to 1%, or 0.2 to 1.5% by weight of the sheet. In these embodiments, the functional additive system can comprise, on a weight basis, 0 to 50% of an ultraviolet stabilizer as disclosed herein and as known in the art, 1 to 10% or 2 to 6% of a porphyrin dye, for example Gentex Filtron A178 and A193 (available from Gentex Corp., Carbondale, Pa.) and those manufactured by Mitsui Chemicals Incorporated, Tokyo Japan, as is known in the art, 49 to 95% or 65 to 95% of an near infrared absorbing pigment, and 0 to 50% or 5 to 30% of an organic dye or pigment, with the ranges combinable in any suitable arrangement.

Because near infrared absorbers can introduce a yellow-greenish color aspect to a polymer sheet, a color correction preferably can be achieved by adding colorants to one or more polymer sheets, and, further, such colorants can be added to polymer sheets in polymer sheet stacks that lack any absorbing agents. Such colorants can include pigments or dyes absorbing in a particular wavelength region that are specifically chosen to change the color of the spectrum as is known in the art.

In various embodiments of the present invention, one or more colorants may be admixed with or printed on the surface of a polymer sheet, such as disclosed in U.S. Pat. Nos. 3,922,456 and 3,982,984. In one embodiment copper phthalocyanine pigment blue can be used as a colorant (Sigma-Aldrich Corp., St. Louis, Mo.). In another embodiment, C.I. solvent blue 102, which is available as "KEYSTONE BLUE RC" (Keystone Aniline Corp., Chicago Ill.), can be used as a colorant.

Formation of the polymer sheets of the present invention can be accomplished through any methods as are well known in the art. Plasticized poly(vinyl butyral) sheet at a thickness of about 0.13 millimeters to 1.3 millimeters, for example, can be formed by extruding the mixed formulation through a sheet die, for example by forcing molten, plasticized poly (vinyl butyral) through a horizontally long vertically narrow die opening substantially conforming in size to the sheet being formed, or by casting molten polymer issuing from an extrusion die onto a die roll in close proximity to the die exit to impart the desired surface characteristics to one side of the polymer.

Polymer sheets of the present invention can have a thickness of more than 100 or 500 microns. In embodiments having more than one polymer sheet, the polymer sheets can total the thicknesses just given, and each individual polymer sheet can be as thin as about 50 microns.

Polymer Film

As used herein, a "polymer film" means a relatively thin and rigid polymer layer that functions as a performance enhancing layer and which corresponds to elements 12 and 16 of FIG. 1. Poly(ethylene terephthalate) or cellulose acetate are most commonly used as a polymer film.

The polymer film can be any suitable film that is sufficiently rigid to provide a relatively flat, stable surface, for example those polymer films conventionally used as a performance enhancing layer in multiple layer glass panels. The polymer film is preferably optically transparent (i.e. objects adjacent one side of the layer can be comfortably seen by the eye of a particular observer looking through the layer from the other side), and usually has a greater, in some embodiments significantly greater, tensile modulus regardless of composition than that of the adjacent polymer sheet. In various embodiments, the polymer film comprises a thermoplastic material. Among thermoplastic materials having suitable properties are nylons, polyurethanes, acrylics, polycarbonates, polyolefins such as polypropylene, cellulose acetates and triacetates, vinyl chloride polymers and copolymers and the like. In various embodiments, a polymer film comprises poly(ethylene terephthalate), poly(ethylene napthalate) (PEN), or cellulose acetate. In various embodiments, the polymer film comprises materials such as re-stretched thermoplastic films having the noted properties, which include polyesters. In various embodiments, the polymer film comprises or consists of poly(ethylene terephthalate), and, in various embodiments, the poly(ethylene terephthalate) has been biaxially stretched to improve strength, and/or has been heat stabilized to provide low shrinkage characteristics when subjected to elevated temperatures (e.g. less than 2% shrinkage in both directions after 30 minutes at 150° C.).

In various embodiments, the polymer film can have a thickness of 0.013 millimeters to 0.20 millimeters, 0.025 millimeters to 0.1 millimeters, or 0.04 to 0.06 millimeters. The polymer film can optionally be surface treated or coated with a functional performance layer to improve one or more properties, such as adhesion or infrared radiation reflection.

Various coating and surface treatment techniques for poly (ethylene terephthalate) film and other polymer films that can be used with the present invention are disclosed in published European Application No. 0157030.

Polymer films can be treated or coated to impart desirable characteristics. For example, polymer films can comprise antireflective layers (such as a coated titanium dioxide or silicon oxide layer) and electromagnetic shielding layers (such as a copper grid or an equivalent material, such as silver, palladium, platinum, and gold—see, for example, U.S. Pat. Nos. 6,197,408; 6,086,979; and 6,207,266). In various embodiments, the shielding component comprises copper wires or a copper mesh, which can be, for example, applied to a polymer film through a photo-lithographic technique.

In various embodiments of the present invention, the first polymer film 12, as shown in FIG. 1, can have an antireflective layer on the surface facing the viewing area and/or a hardcoat disposed on the antireflective layer.

Hardcoats

Hardcoats that can be used with the present invention include any that are compatible with the second polymer film and that achieve the desired physical and optical properties. Thermoplastic, thermoset, or cross linked polymer materials that function as a protective layer, such as a acrylate and urethane hardcoats, can be used as the hardcoat material. Further examples of useful hardcoat materials that can be used as hardcoats for the present invention include radiation cured products, such as ultraviolet or infrared cured products, and cured products resulting from heat or plasma treatment of (a) a hydrolysis and condensation product of methyltriethoxysilane; or (b) mixtures of poly(silicic acid) and copolymers of fluorinated monomers with compounds containing primary and secondary alcohol groups.

Hardcoat materials that are useful with the present invention further include acrylate functional groups, such as a polyester, polyether, acrylic, epoxy, urethane, alkyd, spiroacetal, polybutadiene or polythiol polyene resin having a relatively low molecular weight; a (meth)acrylate oligomer or prepolymer of a polyfunctional compound such as a polyhydric alcohol; or a resin containing, as a reactive diluent, a relatively large amount of a monofunctional monomer such as ethyl(meth)acrylate, ethylhexyl(meth)acrylate, styrene, methylstyrene or N-vinylpyrrolidone, or a polyfunctional monomer such as trimethylolpropane tri(meth)acrylate, hexanediol (meth)acrylate, tripropylene glycol di(meth)acrylate, diethylene glycol di(meth)acrylate, pentaerythritol tri(meth)acrylate, dipentaerythritol hexa(meth)acrylate, 1,6-hexanediol di(meth)acrylate or neopentyl glycol di(meth)acrylate, or mixtures and combinations of any of the foregoing. Other hardcoats, as are known in the art, can be used. In various embodiments, a hardcoat of the present invention comprises a member selected from the group consisting of epoxies, vinyl ethers, and acrylates.

Adhesives

A wide variety of adhesives can be used to adhere plasma display panel filter of the present invention to plasma display panels. Adhesives are chosen based on compatibility with the module and polymer film layers, optical performance, stability, economy, and other relevant factors. Adhesives that can be used without the requirement for high temperatures or high pressure are particularly preferred.

A particularly useful group of adhesives are the pressure sensitive adhesives, or PSAs. Several common technologies are used for manufacturing PSAs, including solvent-based, hot-melt, and emulsion processes. Four main varieties of PSAs are derived from rubber-based, acrylic, modified acrylic, and silicone formulations. Each of these types exhibits distinct performance characteristics.

Acrylic, modified acrylic, and silicone formulations are preferred. Acrylic PSAs offer resistance to solvents, UV light, elevated temperatures, plasticizers, chemical reagents, and sterilization methods, and provide good long-term aging and environmental resistance. Modified acrylics include additives to achieve various desirable results.

PSAs of the present invention can be applied directly to either the module or the plasma display panel filter. For example, a plasma display panel filter can be formed having a pressure sensitive adhesive formed on one surface and protected with a release liner. The liner can be removed when application to a module is desired.

Any of agents described herein as useful in a plasma display panel filter can, where compatible, also be added to the adhesive rather than, or in addition to, the polymer sheet or polymer film layers. Agents can generally be mixed directly into the adhesive prior to application of the adhesive to the plasma display panel module or the plasma display panel filter.

In various embodiments of the present invention, coated glass, a coated polymer structure (typically poly(ethylene terephthalate)), or a multilayer film, such as the those available from 3M and described in U.S. Pat. No. 6,498,683, among others, can be used to absorb infrared radiation.

It is also possible to combine near infrared absorbers with coated glass, coated polymer, or multilayer films in order to achieve the desired result. For example, a combination of near infrared absorbers in poly(vinyl butyral) with infrared reflecting films is reported in U.S. patent application 20030054160, which also reports near infrared absorbers coated on poly (ethylene terephthalate) and combined with poly(vinyl butyral). These combinations can be used with embodiments of the present invention, as appropriate.

In any of the embodiments of the present invention in which an agent is added to a polymer sheet to impart desired characteristics, it is generally possible and will be appreciated by those with skill in the art that some or all of the added agents can be applied to a polymer film layer or glass layer instead of or in addition to the agent's inclusion in the polymer sheet. For example, a polymer film can be coated with $LaB_6$ and then laminated between two polymer sheets to form a polymer sheet stack having two polymer sheets with no pigment or a reduced level of pigment. Some of the agents contemplated herein can also be directly applied to a glass layer, for example the viewing side of a plasma display panel module. Any of the agents of the present invention referred to herein can be used in this manner, where appropriate.

A particular benefit of the present invention is improved overall electromagnetic radiation transmission, absorbance, and reflectance characteristics. Plasma display panel filters of the present invention as described elsewhere herein employing one or more polymer sheets include filters that preferably have the following qualities when the plasma display panel filter is disposed between two layers of glass each having a thickness of 2 millimeters: transmission in the visual range of 20 to 60 percent, 30 to 50 percent, or 35 to 45 percent, transmission at 590 nanometers of 0 to 65 percent, 5 to 50 percent, 10 to 40 percent, or 20 to 30 percent; transmission at 800 nanometers of less than 30 percent, 25 percent, or 20 percent, transmission at 850 nanometers of less than 25 percent, less than 20 percent, or less than 15 percent, transmission in the 900 to 1100 nanometer range of less than 15 percent, less than 12 percent, less than 10 percent, or less than 6 percent; transmission in the 1100 to 1200 nanometers of less than 15 percent or less than 10 percent. Any of the above given ranges can be combined with each other in any combination in any of the various embodiments of the present invention to achieve the desired result.

For any polymeric layer in a filter of the present invention, preferable a* and b* factor (as based on the L*a*b* calorimetric system) values are −15 and +15, −10 and +10, −5 and +5, and −2 and +2.

In various embodiments of the present invention, and specifically for non contact conventional applications, a plasma display panel filter can comprise any suitable glazing type material other than glass, such as rigid plastics having a high glass transition temperature, for example above 60° C. or 70°

C., for example polycarbonates and polyalkyl methacrylates, and specifically those having from 1 to 3 carbon atoms in the alkyl moiety.

The present invention also includes methods for filtering the electromagnetic radiation produced by a plasma display panel, comprising passing said radiation through any of the plasma display panel filters disclosed herein.

The present invention further includes devices that use plasma display panels in which a plasma display panel filter of the present invention is used. Examples include, but are not limited to monitors or televisions.

The present invention includes a plasma display panel comprising a plasma display panel filter of the present invention.

The present invention includes the composite structure of a plasma display panel filter of the present invention disposed in position on the viewing surface of a plasma display panel module.

The present invention includes methods of making plasma display panel filters including those described herein throughout.

The present invention also includes methods of making plasma display panels and composite plasma display panel filter/plasma display panel module units as disclosed elsewhere herein.

Using the CIELAB system, a well-known international standard for color measurement, the color of an object under fixed viewing conditions can be defined. A set of dimensionless coordinates $L^*$, $a^*$, $b^*$ are used to define a color's hue and intensity. These coordinates are measured according to instructions provided in the publication "Standard Practice for Computing the Colors of Objects by Using the CIE System," ASTM E 308-01. The wavelength range is between 400 nanometers and 700 nanometers, at a wavelength interval of 20 nanometers. The coordinate $L^*$ is used to measure the lightness or darkness of a color. White is denoted by $L^*=100$ and black is denoted by $L^*=0$. The coordinate $a^*$ measures the level of green or red color in the object, and the coordinate $b^*$ measures the level of blue or yellow in the object.

EXAMPLES

Example 1

A plasma display panel filter for direct lamination is produced having the following layers:

NOF Realook 8200 (NOF Corporation, Tokyo, Japan) as an antireflective triacetyl cellulose layer, having a thickness of 80 microns.

A poly(vinyl butyral) layer with the following composition: Filtron A178 (0.004%); Excolor IR910 (0.042%); Excolor IR14 (0.005%); Excolor IR12 (0.042%) (Sumitomo Asoka Cement, Ltd.). The Filtron dye is available from Gentex and the Excolor dyes are available by Nippon Shokubai (Japan). The plasticizer content (triethylene glycol di-2 ethylhexanoate) of the poly(vinyl butyral) layer is 27.5%.

A Hitachi Cu-grid film reference ES-1534 U HCC-42-01A as an EMI shielding component.

The three layers are applied to a layer of 2.1 millimeter clear annealed glass. The following optical properties are obtained:

Tl at 590 nm: 30.0%
Tl at 815 nm: 14.5%
Tl at 850 nm: 6.3%
Tl at 900 nm: 5.1%
Tl at 950 nm: 7.0%
Tl at 980 nm: 8.4%

The thickness of the poly(vinyl butyral) in this configuration was 44.6%, the color coordinates as expressed by $a^*$ and $b^*$ were −3.0 and −4.5, respectively, giving a rather bluish aspect to the system, which is generally desirable for plasma display panels.

Example 2

Impact testing of filters of the type given in Example 1 is carried out using a ball impact tester: a 200 gram steel ball is dropped onto the filter in 5 centimeter increments until breakage of the glass occurs. For annealed glass with no poly (ethylene terephthalate) or poly(vinyl butyral) adhered to the glass pane, the glass is broken at a drop height of 5 cm.

For filters having a poly(ethylene terephthalate) thickness of 180 microns and a poly(vinyl butyral) layer thickness of 0.38 mm, a maximum drop height of 20 centimeters is obtained before breakage occurred. For filters having a poly (ethylene terephthalate) thickness of 180 microns and a poly (vinyl butyral) layer thickness of 0.76 millimeters, a maximum drop height of 45 centimeters is obtained. For filters having a poly(ethylene terephthalate) thickness of 180 microns and a poly(vinyl butyral) layer thickness of 1.14 millimeters, a maximum drop height of 95 cm is achieved, corresponding to an absorbed energy of approximately 1.95 Joules.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the appended claims.

It will further be understood that any of the ranges, values, or characteristics given for any single component of the present invention can be used interchangeably with any ranges, values, or characteristics given for any of the other components of the invention, where compatible, to form an embodiment having defined values for each of the components, as given herein throughout.

Figures are understood to not be drawn to scale unless indicated otherwise.

Each reference, including journal articles, patents, applications, and books, referred to herein is hereby incorporated by reference in its entirety.

We claim:

1. A method of manufacturing a multiple layer polymeric laminate, comprising:
    extruding one or more plasticized poly(vinyl butyral) polymer sheets; and,
    passing said one or more plasticized poly(vinyl butyral) polymer sheets and two polymer films between two rollers while said one or more plasticized poly(vinyl butyral) polymer sheets are still in the hot melt phase, thereby laminating said one or more plasticized poly (vinyl butyral) polymer sheets and said polymer films to form said multiple layer polymeric laminate, wherein said polymer films are disposed on the outside of said multiple layer polymer laminate;
    wherein said extruding includes extruding at least one coextruded poly(vinyl butyral) polymer sheet.

2. The method of claim 1, wherein said extruding includes extruding two or more plasticized poly(vinyl butyral) polymer sheets.

3. The method of claim 1, wherein each of said one or more plasticized poly(vinyl butyral) polymer sheets has a roughness value of less than 20 microns on both surfaces.

4. A plasma display panel filter produced by the method, comprising:

extruding one or more plasticized poly(vinyl butyral) polymer sheets; and, passing said one or more plasticized poly(vinyl butyral) polymer sheets and two polymer films between two rollers while said one or more plasticized poly(vinyl butyral) polymer sheets are still in the hot melt phase, thereby laminating said one or more plasticized poly(vinyl butyral) polymer sheets and said polymer films to form a multiple layer polymeric laminate, wherein said polymer films are disposed on the outside of said multiple layer polymer laminate.

5. The plasma display panel filter of claim 4, wherein said rollers are polished rollers.

6. The plasma display panel filter of claim 4, wherein one or both of said polymer films comprise poly(ethylene terephthalate), poly(ethylene napthalate), or cellulose acetate.

7. The plasma display panel filter of claim 4, wherein said extruding includes extruding a single plasticized poly(vinyl butyral) polymer sheet.

8. The plasma display panel filter of claim 4, wherein said extruding includes extruding at least one coextruded poly(vinyl butyral) polymer sheet.

9. The plasma display panel filter of claim 4, wherein said extruding includes extruding two or more plasticized poly(vinyl butyral) polymer sheets.

10. The plasma display panel filter of claim 4, wherein each of said one or more plasticized poly(vinyl butyral) polymer sheets has a roughness value of less than 20 microns on both surfaces.

11. A plasma display panel comprising a plasma display panel filter manufactured by the method comprising:

extruding one or more plasticized poly(vinyl butyral) polymer sheets; and, passing said one or more plasticized poly(vinyl butyral) polymer sheets and two polymer films between two rollers while said one or more plasticized poly(vinyl butyral) polymer sheets are still in the hot melt phase, thereby laminating said one or more plasticized poly(vinyl butyral) polymer sheets and said polymer films to form a multiple layer polymeric laminate, wherein said polymer films are disposed on the outside of said multiple layer polymer laminate.

12. The plasma display panel of claim 11, wherein said rollers are polished rollers.

13. The plasma display panel of claim 11, wherein one or both of said polymer films comprise poly(ethylene terephthalate), poly(ethylene napthalate), or cellulose acetate.

14. The plasma display panel of claim 11, wherein said extruding includes extruding a single plasticized poly(vinyl butyral) polymer sheet.

15. The plasma display panel of claim 11, wherein said extruding includes extruding at least one coextruded poly(vinyl butyral) polymer sheet.

16. The plasma display panel of claim 11, wherein said extruding includes extruding two or more plasticized poly(vinyl butyral) polymer sheets.

17. The plasma display panel of claim 11, wherein each of said one or more plasticized poly(vinyl butyral) polymer sheets has a roughness value of less than 20 microns on both surfaces.

* * * * *